United States Patent
Xu et al.

(10) Patent No.: US 11,874,158 B2
(45) Date of Patent: Jan. 16, 2024

(54) FULLY SOFT SELF-POWERED VIBRATION SENSOR AND ITS FABRICATION METHOD

(71) Applicant: Zhejiang University, Hangzhou (CN)

(72) Inventors: Kaichen Xu, Hangzhou (CN); Huayu Luo, Hangzhou (CN); Haonan Zhao, Hangzhou (CN); Jiachen Ye, Hangzhou (CN); Zheyu Dong, Hangzhou (CN); Geng Yang, Hangzhou (CN); Huayong Yang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/124,279

(22) Filed: Mar. 21, 2023

(65) Prior Publication Data
US 2023/0304852 A1 Sep. 28, 2023

(30) Foreign Application Priority Data
Mar. 22, 2022 (CN) .......................... 202210287824.6

(51) Int. Cl.
*G01H 11/06* (2006.01)
*B23K 26/359* (2014.01)
(Continued)

(52) U.S. Cl.
CPC .......... *G01H 11/06* (2013.01); *B23K 26/359* (2015.10); *B23K 26/38* (2013.01); *B23K 26/402* (2013.01);
(Continued)

(58) Field of Classification Search
CPC . G01P 15/006; G01P 15/135; B23K 2103/42; B23K 26/359; B23K 26/38;
(Continued)

(56) References Cited

U.S. PATENT DOCUMENTS

2016/0224152 A1* 8/2016 Kim .................... G01L 1/146
2018/0059134 A1* 3/2018 Yee .................... G01C 19/58
(Continued)

FOREIGN PATENT DOCUMENTS

CN    108761129 A  * 11/2018
CN    108956737 A  * 12/2018
(Continued)

OTHER PUBLICATIONS

Zhu et al., Progress in TENG technology—A journey from energy harvesting to nanoenergy and nanosystem, EcoMat, Wiley, 2020 (Year: 2020).*
(Continued)

*Primary Examiner* — David L Singer

(57) ABSTRACT

A method for preparing a fully soft self-powered vibration sensor mainly uses a laser carbonization technology to prepare a two-dimensional porous carbon electrode with an origami structure, and then transfers the two-dimensional porous carbon electrode to a three-dimensional polydimethylsiloxane (PDMS) cavity through mold transfer; finally, a laser engraving technology is used to create microstructures on surfaces of the porous carbon electrode and a PDMS film. The sensor includes the PDMS film, a liquid metal droplet oscillator, a porous out-of-plane carbon electrode, and a 3D PDMS cavity assembled tightly from top to bottom. The sensor works based on the triboelectric nanogenerator principle, when the sensor is excited by vibrations, contact and triboelectrification at an interface of the liquid metal droplet oscillator and PDMS film charge both objects, making contact surfaces carry stable charges, which allows the movement of the liquid metal droplet oscillator to output current through electrostatic induction.

5 Claims, 4 Drawing Sheets

(51) Int. Cl.

| | |
|---|---|
| *B23K 26/38* | (2014.01) |
| *B23K 26/402* | (2014.01) |
| *B29C 70/68* | (2006.01) |
| *B29C 70/70* | (2006.01) |
| *B29C 70/88* | (2006.01) |
| *G01P 15/00* | (2006.01) |
| *B23K 103/00* | (2006.01) |
| *B29K 83/00* | (2006.01) |
| *B29K 707/04* | (2006.01) |
| *B29L 31/40* | (2006.01) |

(52) U.S. Cl.
CPC ............ *B29C 70/683* (2013.01); *B29C 70/70* (2013.01); *B29C 70/882* (2013.01); *G01P 15/006* (2013.01); *B23K 2103/42* (2018.08); *B29K 2083/00* (2013.01); *B29K 2707/04* (2013.01); *B29L 2031/40* (2013.01)

(58) Field of Classification Search
CPC ..... B23K 26/402; B29C 70/683; B29C 70/70; B29C 70/882; B29K 2083/00; B29K 2707/04; B29L 2031/40; G01C 9/18; G01H 11/06; H01H 35/14; H02N 1/04
USPC ...................................................... 73/514.09
See application file for complete search history.

(56) References Cited

U.S. PATENT DOCUMENTS

| | | | |
|---|---|---|---|
| 2021/0257932 A1* | 8/2021 | Lee | G01C 19/5783 |
| 2022/0360197 A1* | 11/2022 | Ping | H01G 11/08 |

FOREIGN PATENT DOCUMENTS

| | | | |
|---|---|---|---|
| CN | 108956737 A | | 12/2018 |
| CN | 208766199 U | * | 4/2019 |
| CN | 111198052 A | * | 5/2020 |
| CN | 112388168 A | * | 2/2021 |
| CN | 113067494 A | * | 7/2021 |
| CN | 113507232 A | * | 10/2021 |

OTHER PUBLICATIONS

Li et al., Ga Based Particles, Alloys and Composites: Fabrication and Applications, Nanomaterials 2021, 11, 2246. (Year: 2021).*
Zhang et al., Self-Powered Acceleration Sensor Based on Liquid Metal Triboelectric Nanogenerator for Vibration Monitoring, 2017 American Chemical Society (Year: 2017).*
Wu et al., Self-Powered Sensors and Systems Based on Nanogenerators, Sensors 2020, 20, 2925 (Year: 2020).*
Bhuyan et al., Liquid Metal Patterned Stretchable and Soft Capacitive Sensor with Enhanced Dielectric Property Enabled by Graphite Nanofiber Fillers, Polymers 2022, 14, 710. (Year: 2022).*
Zhang Binbin et al., Self-Powered Acceleration Sensor Based on Liquid Metal Triboelectric Nanogenerator for Vibration Monitoring, ACS nano, Jul. 3, 2017, pp. 7440-7446, vol. 11, No. 7, 2017 American Chemical Society, America.
CNIPA, Notification of a First Office Action for CN202210287824.6, dated Oct. 18, 2022.
Zhejiang University (Applicant), Response to Notification of a First Office Action for CN202210287824.6, w/ (allowed) replacement claims, Dec. 16, 2022.
CNIPA, Notification to grant patent right for invention in CN202210287824.6, dated Feb. 16, 2023.

* cited by examiner

FULLY SOFT SELF-POWERED VIBRATION SENSOR AND ITS FABRICATION METHOD

TECHNICAL FIELD

The disclosure belongs to the technical field of flexible sensors, relates to a fully soft self-powered vibration sensor and its fabrication method, and in particular to a fully soft self-powered vibration sensor based on the triboelectrification between liquid metal and PDMS, which is a soft material.

DESCRIPTION OF RELATED ART

Mechanical vibration is a common form of motion in engineering equipment, buildings, as well as biological systems. Harvesting the mechanical energy from vibrations has the potential to provide sustainable power to distributed electronics in the vicinity, thus reducing the reliance on batteries. Additionally, vibration signals also reveal the status of an operating object, such as the peak acceleration during collisions or the modal characteristics of gear systems. Therefore, using vibration sensors to collect vibration signals along with leveraging the vibration energy to power sensors can result in high-performance, self-powered sensing systems.

In recent years, self-powered sensors based on the principle of triboelectric nanogenerators (TENG) have been extensively studied. Attributed to the coupled effects of triboelectrification and electrostatic induction, repetitive mechanical motion can generate electrical signals that reflect the characteristics of the motion. By rendering the moving components sensitive to external vibrations, researchers have designed several typical TENG-based self-powered vibration sensors.

However, most of the existing TENG-based self-powered vibration sensors are subject to the spring-mass-damper model. The main drawbacks include: (1) the frequency response of the sensor is limited by the natural frequency of the spring-mass-damper system, the natural frequency is determined by both the spring and the load, and thus motions far from the natural frequency generate minor signals; (2) the materials involved are mostly rigid, which limit the installation on curved surfaces and wearing comfort on humans; (3) repeated frictions on solid-solid interfaces rub sensitive materials, affecting the sensor's lifespan. Liquid metal is a type of metal material with high surface tension, high saturation vapor pressure, intrinsic softness, as well as electron-losing ability. Compared with the highly toxic mercury, non-toxic gallium-based alloys are more suitable for sensors. The disclosure proposes a fully soft self-powered vibration sensor utilizing the freestanding mobility of a gallium-based metal droplet oscillator under vibration to solve inherent problems of the existing self-powered vibration sensors, providing a new avenue toward wider working range and long-term stability of self-powered vibration sensors.

SUMMARY OF THE DISCLOSURE

The purpose of the disclosure is to propose a fully soft self-powered vibration sensor and its fabrication method using a liquid metal droplet as an oscillator of the sensor, which overcomes the deficiencies of prior arts and provides a wider working range and stable performance.

The technical solutions adopted by the disclosure are as follows.

According to a specific embodiment of the disclosure, a fully soft self-powered vibration sensor includes a polydimethylsiloxane (PDMS) film, a liquid metal droplet oscillator (also referred to liquid metal droplet), an out-of-plane porous carbon electrode (also referred to three-dimensional porous carbon electrode), and a PDMS cavity, all of which are tightly assembled from top to bottom in that order.

The sensing function of the disclosure is subjected to the principle of a single-electrode TENG, which includes triboelectrification and electrostatic induction. During vibrations, the liquid metal droplet oscillator and the PDMS film surface contact with each other, resulting in stable negative charges on the PDMS film and an equal amount of positive charges on the liquid metal droplet oscillator. Due to electrostatic induction, when the liquid metal droplet oscillator moves facing away from the PDMS film, the positive charges would flow to the porous carbon electrode through the load of external circuits; when the liquid metal droplet oscillator approaches the PDMS film, the positive charge flows from the porous carbon electrode to the load. Therefore, repeated vibration can generate periodic induced current at the porous carbon electrode.

According to a specific embodiment of the disclosure, the fabrication method of the disclosure is based on laser processing, which realizes an extendable out-of-plane porous carbon electrode and microstructures on curved surfaces, ensuring stable movements of the liquid metal droplet oscillator. The fabrication method includes: carbonizing a polyimide film by the photothermal effect of a $CO_2$ laser to generate a two-dimensional porous carbon electrode with an origami structure; then transferring the two-dimensional porous carbon electrode to a three-dimensional PDMS cavity through mold transfer method; engraving microstructures on surfaces of the porous carbon electrode and the PDMS film by a UV pulsed laser, so as to regulate the wettability of these surfaces toward the liquid metal droplet, and make these surfaces do not adhere to the liquid metal droplet.

According to a fully soft self-powered vibration sensor provided by the disclosure, the out-of-plane porous carbon electrode, the PDMS cavity and the PDMS film which are manufactured based on laser auxiliary jointly form a main body of the sensor, so that the reciprocating motion of the liquid metal droplet oscillator in the sensor can be realized. The proposed fully soft self-powered vibration sensor may be widely used in the fields of wearable electronic devices, human-machine intelligent interaction, and the like.

In order to achieve the purpose, according to a specific embodiment of the disclosure, a method for preparing a fully soft self-powered vibration sensor of the disclosure includes the following steps:

1. a CO2 laser is used to carbonize a polyimide substrate to generate a two-dimensional porous carbon electrode in a predefined pattern, and the two-dimensional porous carbon electrode is cut down along an edge of the pattern;
2. the polyimide substrate together with the 2D porous carbon electrode pattern are attached to a mold complementary to a sensor cavity, and a PDMS solution to be cured (a mass ratio of a prepolymer to a curing agent is 15:1) is filled into the mold to obtain a sample;
3. the above sample is placed in a vacuum chamber to evacuate air for 5 minutes and to make the PDMS solution penetrate into pores of porous carbon; then the sample is taken out and heated in an 80° C. environment for 1 hour to fully cure the PDMS solution;

4. the PDMS solid is removed from the mold, and the polyimide is peeled off to separate the porous carbon electrode from it, thus the transfer of the porous carbon electrode onto an out-of-plane surface is completed;
5. a UV pulsed laser is used to engrave microstructures on surfaces of the out-of-plane porous carbon electrode and the PDMS film, making the engraved surface non-adhesive to the liquid metal droplet; and
6. a liquid metal droplet with 0.15 g is injected into the cavity defined by the out-of-plane porous carbon electrode, and the engraved PDMS film seals the cavity with the engraved surface of the engraved PDMS film facing inward.

The liquid metal droplet in the disclosure can be any liquid metal, preferably gallium-based alloys.

The disclosure has the following advantages:

(1) the sensor of the disclosure has a wider frequency response range than the spring-based vibration sensors, outputting effective signals under vibrations of both high and low frequencies; (2) the sensor of the disclosure uses a fully soft material composition including silicone gel and liquid metal, facilitating installation and wearing comfort; and (3) the sensor of the disclosure has a higher lifespan and lower abrasion during operation due to the solid-liquid contact between the oscillator and surrounding surfaces.

DETAILED DESCRIPTION OF EMBODIMENTS

Further explanation of the technical solutions of the disclosure is provided below in conjunction with the figures and embodiments.

Figure 1:
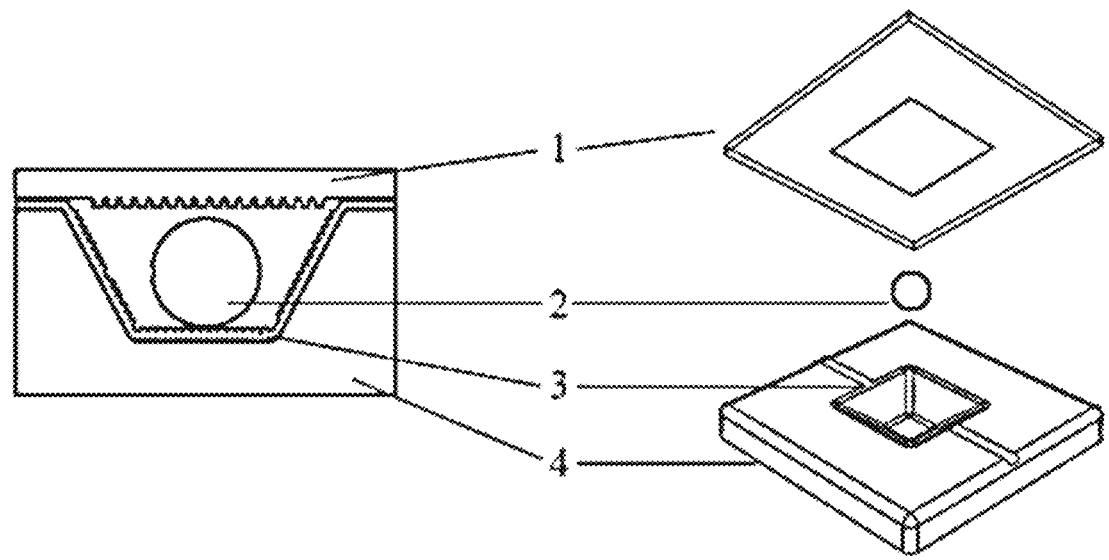
FIG. 1 is a schematic structural diagram of a fully soft self-powered vibration sensor according to an embodiment of the disclosure.

As shown in FIG. 1, a fully soft self-powered vibration sensor of the disclosure is formed by assembling a PDMS film 1, a liquid metal droplet oscillator 2 (taking eutectic gallium-indium as an example), an out-of-plane porous carbon electrode 3, and a PDMS cavity 4 tightly from top to bottom. An inner surface of the PDMS film 1 and a curved surface of the out-of-plane porous carbon electrode 3 are engraved by a UV pulsed laser to form microstructures.

Figure 2:
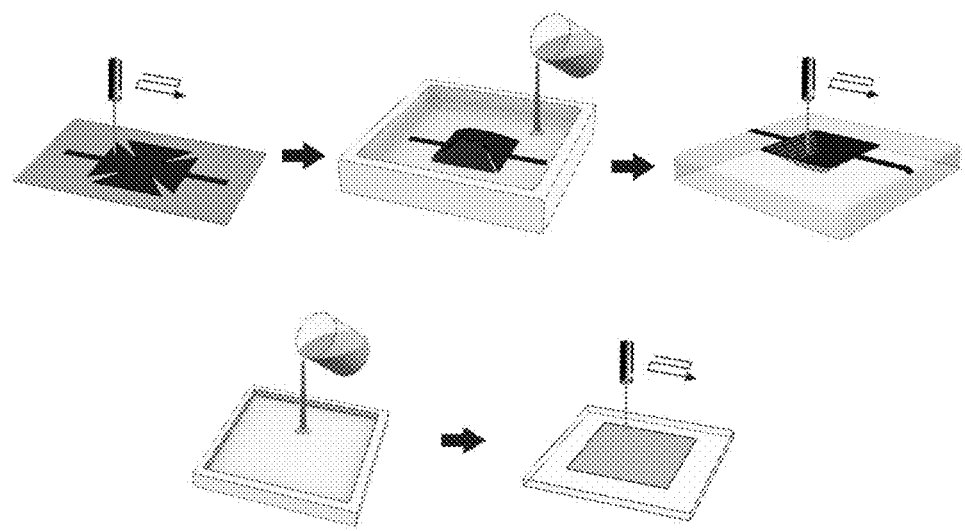
FIG. 2 is a flowchart of preparing the fully soft self-powered vibration sensor according to an embodiment of the disclosure.

As shown in FIG. 2, from top to bottom are schematic diagrams of the processing steps of the out-of-plane porous carbon electrode 3 and PDMS film 1. The processing of out-of-plane porous carbon electrode 3 includes three steps: firstly, carbonization of a polyimide substrate is achieved by the photothermal effect of $CO_2$ laser, resulting in a two-dimensional porous carbon electrode with an origami shape; secondly, the electrode is attached to a convex surface of the mold, such that the electrode folds to conform to the out-of-plane structure, and the liquid PDMS to be cured is then injected into the mold, so that the liquid PDMS penetrates into the pores of the porous carbon electrode; finally, the cured PDMS cavity 4 is released from the mold, and the out-of-plane porous carbon electrode 3 is transferred to the surface of the PDMS cavity 4, and its surface is then engraved by the UV pulsed laser to form microstructures. The processing of PDMS film 1 includes two steps: firstly, a pristine PDMS film of a given size is produced by the mold method; secondly, the surface of the PDMS film is engraved by UV pulsed laser to form microstructures.

After the out-of-plane porous carbon electrode 3 is transferred to the surface of PDMS cavity 4, the two materials have been tightly integrated, so the cracks caused by the strain of the out-of-plane porous carbon electrode 3 will recovered afterwards due to the resilience of the PDMS cavity 4.

Embodiment 1

The experimental conditions for testing the current of the disclosure are as follows: the fully soft self-powered sensor is placed in an aluminum shield box and the out-of-plane porous carbon electrode 3 is connected to the input port of the electrostatic meter through a coaxial cable. The sensor, along with the shield box, is fixed on an electrodynamic shaker, which operates in a sinusoidal vibration mode with an amplitude of 1 mm. The frequency is swept through the following sequence: 41.6, 40, 38.6, 37, 35.6, 34.2, 32.6, 31, 29.4, 27.6, 25.7, 23.6, 21.3, 18.9, 15.9, 12.4 in Hz. Each frequency is maintained for 10 s, and there is a 5 s interval between adjacent frequencies. The peak acceleration under the above vibrations are 68.5, 63.3, 58.8, 54.0, 50.1, 46.1, 41.9, 37.9, 34.1, 30.0, 26.1, 22.1, 17.9, 14.0, 10.0, and 6.0 in $m/s^2$, respectively.

Figure 3A:
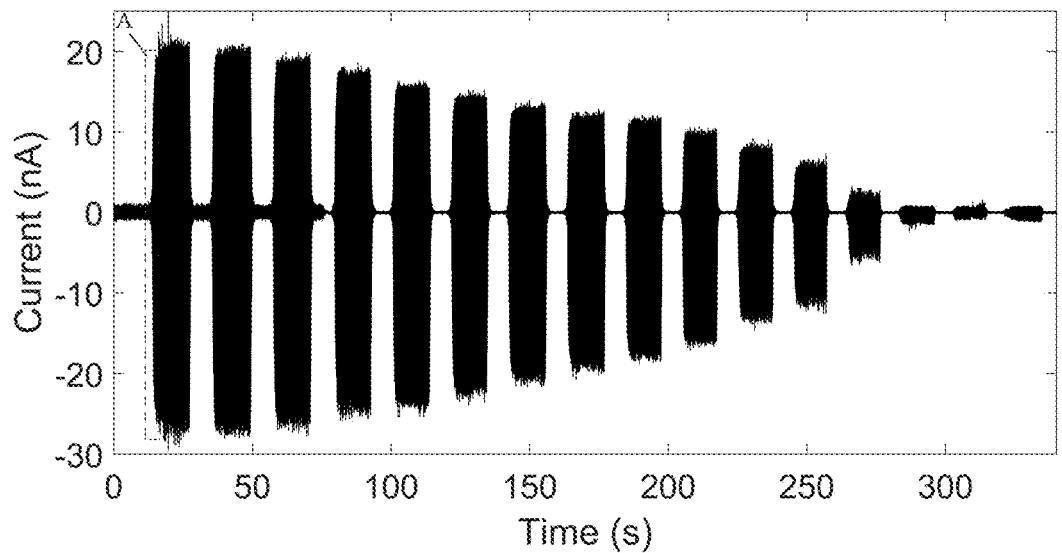
FIG. 3A is a schematic diagram showing current signals generated by the fully soft self-powered vibration sensor of the disclosure under sinusoidal vibrations with the same amplitude but different frequencies.
Figure 3B:
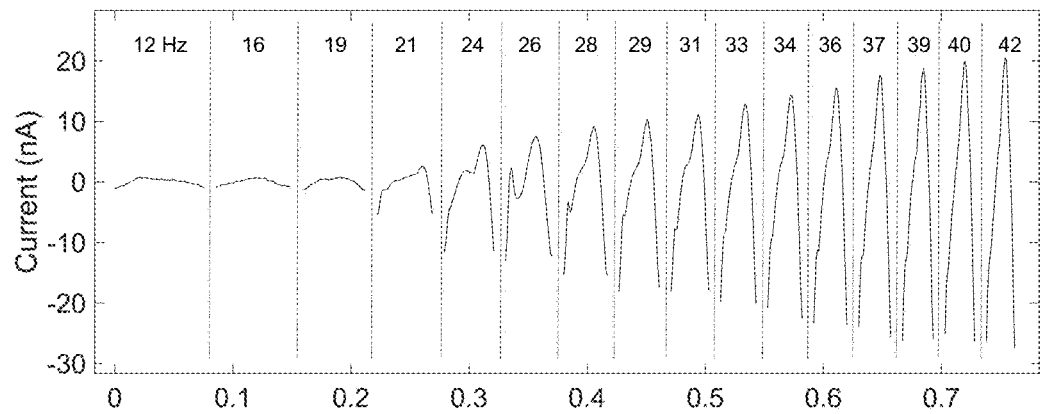
FIG. 3B is an enlarged view of a part A of FIG. 3A.

The current signal is shown in FIG. 3A and FIG. 3B. It can be seen that the current signal increased significantly when the vibration frequency exceeded 19 Hz. The amplitude of current signal shows a positive correlation with the vibration frequency.

Figure 4:
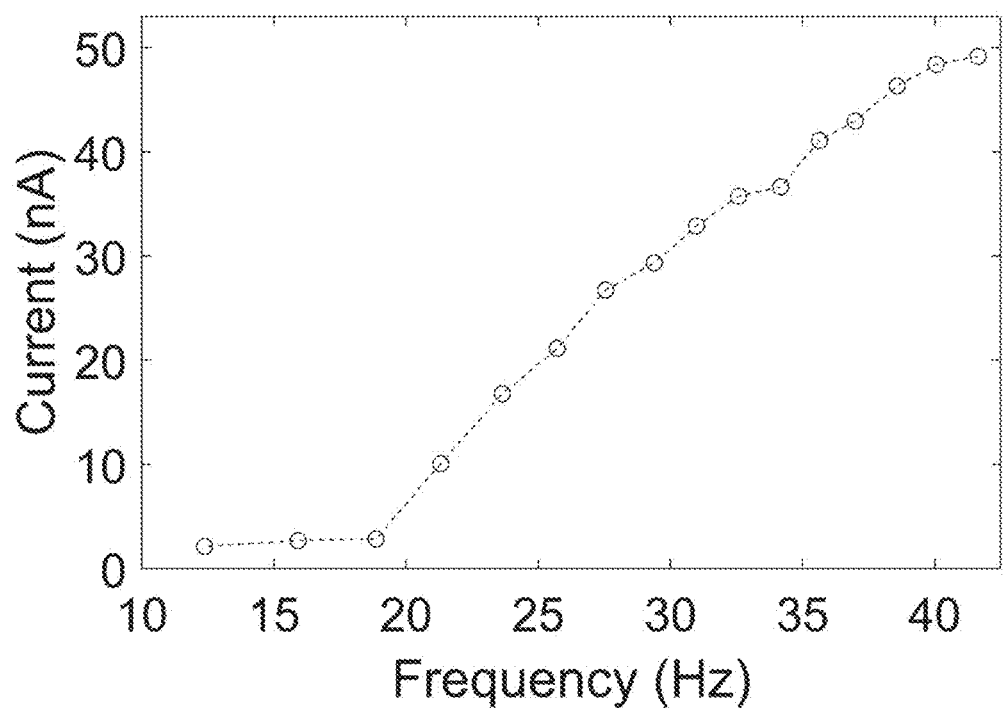
FIG. 4 is a schematic diagram showing the relationship between the peak acceleration and the peak-to-peak current of the fully soft self-powered vibration sensor of the disclosure.

During the experiment, the relationship between vibration frequency and peak value of current signal is shown in FIG. 4, the peak accelerations corresponding to the least three frequencies are 6 $m/s^2$, 10 $m/s^2$, and 14 $m/s^2$, respectively. When the peak acceleration is less than or close to the gravitational acceleration, the liquid metal droplet oscillator 2 could not completely separate from the porous carbon electrode 3, and thus no triboelectrification with the PDMS film 1. Therefore, there is no significant current signal when the sensor is subjected to these three frequencies. For the other frequencies, there is a clear linear positive correlation between the frequency and the peak-to-peak value of the current signal, with a maximum range approaching 42 Hz and a corresponding peak acceleration of 70 $m/s^2$.

Therefore, the disclosure can effectively output a current signal that reflects the vibration state of an object.

Embodiment 2

The stability test of the disclosure is conducted under the following conditions: the fully soft self-powered sensor is placed in an aluminum shield box. The out-of-plane porous carbon electrode 3 is connected to the input port of the electrostatic voltmeter through a coaxial cable. The sensor and shield box are fixed on the electrodynamic shaker operated in sinusoidal vibration mode with an amplitude of 1 mm and a frequency of 29 Hz for more than 1700 cycles.

Figure 5:
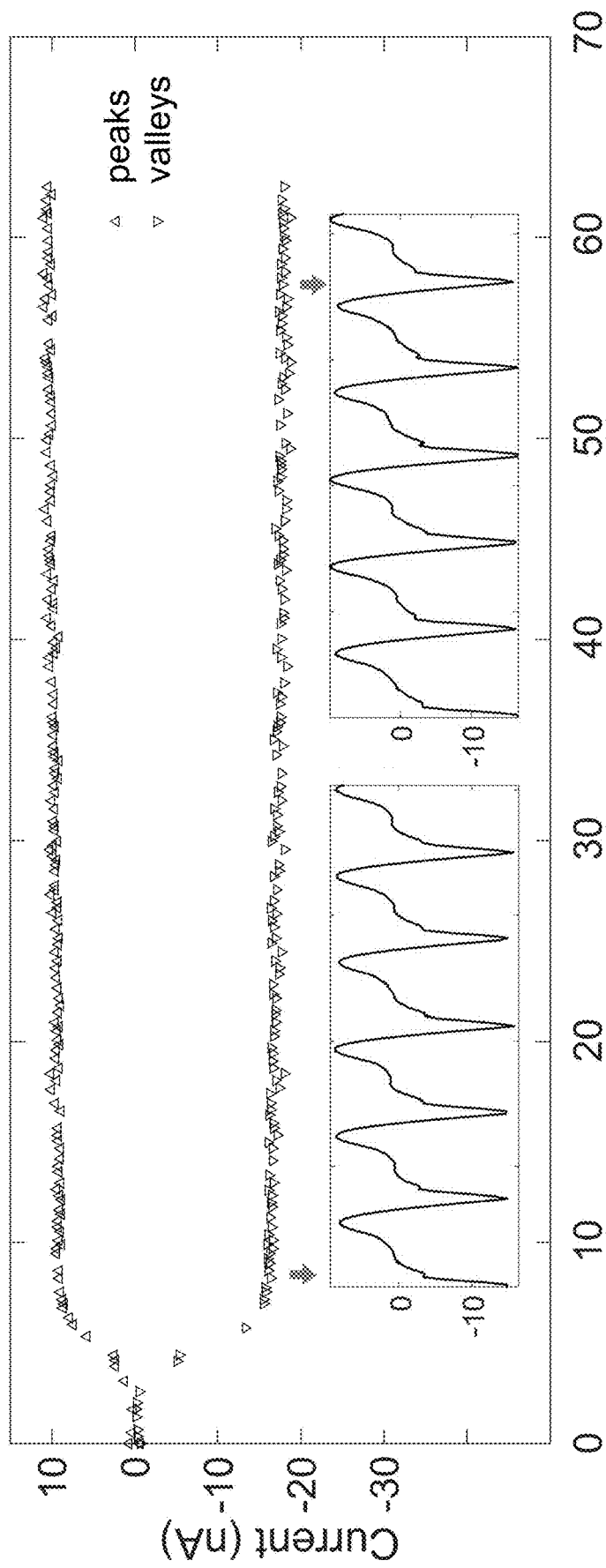
FIG. 5 is a schematic diagram showing the stability of current signals generated by the fully soft self-powered vibration sensor of the disclosure during vibrations of 1700 times.

As shown in FIG. 5, there is no significant difference in the peak-to-peak currents of the sensor at the beginning and end of the experiment, and even the waveforms are highly consistent.

Therefore, the disclosure maintains the stable performance after long-term vibrations.

What is claimed is:

1. A method for preparing a fully soft self-powered vibration sensor, wherein the fully soft self-powered vibration sensor comprises: a polydimethylsiloxane (PDMS) film, a liquid metal droplet oscillator, an out-of-plane porous carbon electrode, and a PDMS cavity; the out-of-plane porous carbon electrode is disposed on a surface of the PDMS cavity, and the PDMS film covers the PDMS cavity and assembled with the PDMS cavity to form a cavity, and the liquid metal droplet oscillator is disposed inside the cavity; wherein the method comprises the following steps:
   1) forming a two-dimensional porous carbon electrode with an origami structure, comprising: using a $CO_2$ laser to carbonize a polyimide substrate according to a predesigned pattern to generate the two-dimensional porous carbon electrode, and cutting down the two-dimensional porous carbon electrode along a pattern edge;
   2) attaching the polyimide substrate together with the two-dimensional porous carbon electrode onto a mold complementary to the cavity, and filling the mold with a PDMS solution to be cured to obtain a sample;
   3) placing the sample in a vacuum chamber to evacuate air, making the PDMS solution penetrate into pores of porous carbon; then taking out the sample and heating the sample to fully cure the PDMS solution;
   4) forming the out-of-plane porous carbon electrode, comprising: removing a PDMS solid from the mold, peeling off the polyimide substrate to separate it from a porous carbon electrode, completing transfer of the porous carbon electrode onto an out-of-plane surface of the PDMS cavity; and
   5) engraving microstructures on surfaces of the out-of-plane porous carbon electrode and the PDMS film using a UV pulsed laser, injecting a liquid metal droplet into the PDMS cavity, and covering the PDMS film above the PDMS cavity for sealing the PDMS cavity.

2. The method for preparing the fully soft self-powered vibration sensor according to claim 1, wherein the microstructures are formed on a bottom surface of the PDMS film and the surface of the out-of-plane porous carbon electrode.

3. The method for preparing the fully soft self-powered vibration sensor according to claim 1, wherein the liquid metal droplet oscillator is based on eutectic gallium-indium.

4. The fully soft self-powered vibration sensor prepared by the method according to claim 1, wherein the fully soft self-powered vibration sensor generates periodic induced currents at the out-of-plane porous carbon electrode during vibration through triboelectrification between the liquid metal droplet oscillator and the surface of the PDMS film, by the liquid metal droplet oscillator approaching or leaving the PDMS film.

5. The fully soft self-powered vibration sensor according to claim 4, wherein the PDMS film carries negative charges and the liquid metal droplet oscillator carries an equal amount of positive charges after the triboelectrification; when the liquid metal droplet oscillator moves facing away from the PDMS film, the positive charges flow through external circuit loads towards the out-of-plane porous carbon electrode; and when the liquid metal droplet oscillator moves approaching to the PDMS film, the positive charges flow from the out-of-plane porous carbon electrode towards the external circuit loads.

* * * * *